United States Patent [19]

Kingery

[11] 4,315,484

[45] Feb. 16, 1982

[54] ANIMAL FEEDER

[75] Inventor: Charles A. Kingery, Washington Court House, Ohio

[73] Assignee: Marting Mfg. Inc., Washington Court House, Ohio

[21] Appl. No.: 159,692

[22] Filed: Jun. 16, 1980

[51] Int. Cl.³ .............................................. A01K 5/00
[52] U.S. Cl. ........................................ 119/53; 119/54
[58] Field of Search .................... 119/52 A, 53.5, 53, 119/54

[56] References Cited

U.S. PATENT DOCUMENTS

| | | | |
|---|---|---|---|
| 1,198,353 | 9/1916 | Huffman et al. | 119/54 |
| 1,701,338 | 2/1929 | Rowles | 119/54 |
| 2,111,950 | 3/1938 | Thiemann | 119/53 |
| 3,030,919 | 4/1962 | Johnson | 119/53 |
| 4,167,154 | 9/1979 | Hill | 119/53 |

FOREIGN PATENT DOCUMENTS

| | | | |
|---|---|---|---|
| 214414 | 4/1924 | United Kingdom | 119/53.5 |
| 710352 | 6/1954 | United Kingdom | 119/54 |

Primary Examiner—Paul J. Hirsch
Assistant Examiner—Robert P. Swiatek
Attorney, Agent, or Firm—Wood, Herron & Evans

[57] ABSTRACT

An animal feeder is disclosed which comprises a feed trough and a hopper mounted above the trough for automatically feeding stored food into the feed trough as it is consumed by animals feeding therein. Flow of food from the hopper into the feed trough is controlled by an agitator or butt plate located within the trough and spaced a predetermined distance from the bottom of the trough. A wire grid extends from the butt plate upwardly into the hopper such that agitation or movement of the butt plate by animals feeding within the trough causes corresponding movement of the wire grid. To control the flow of food from the hopper into the trough, the butt plate is adjustable relative to the trough so as to vary the size of the opening through which the food must flow in order to become accessible to animals feeding in the trough. This adjustment is effected by a pivoted lever which is controlled from a handle located in the open top of the hopper.

3 Claims, 4 Drawing Figures

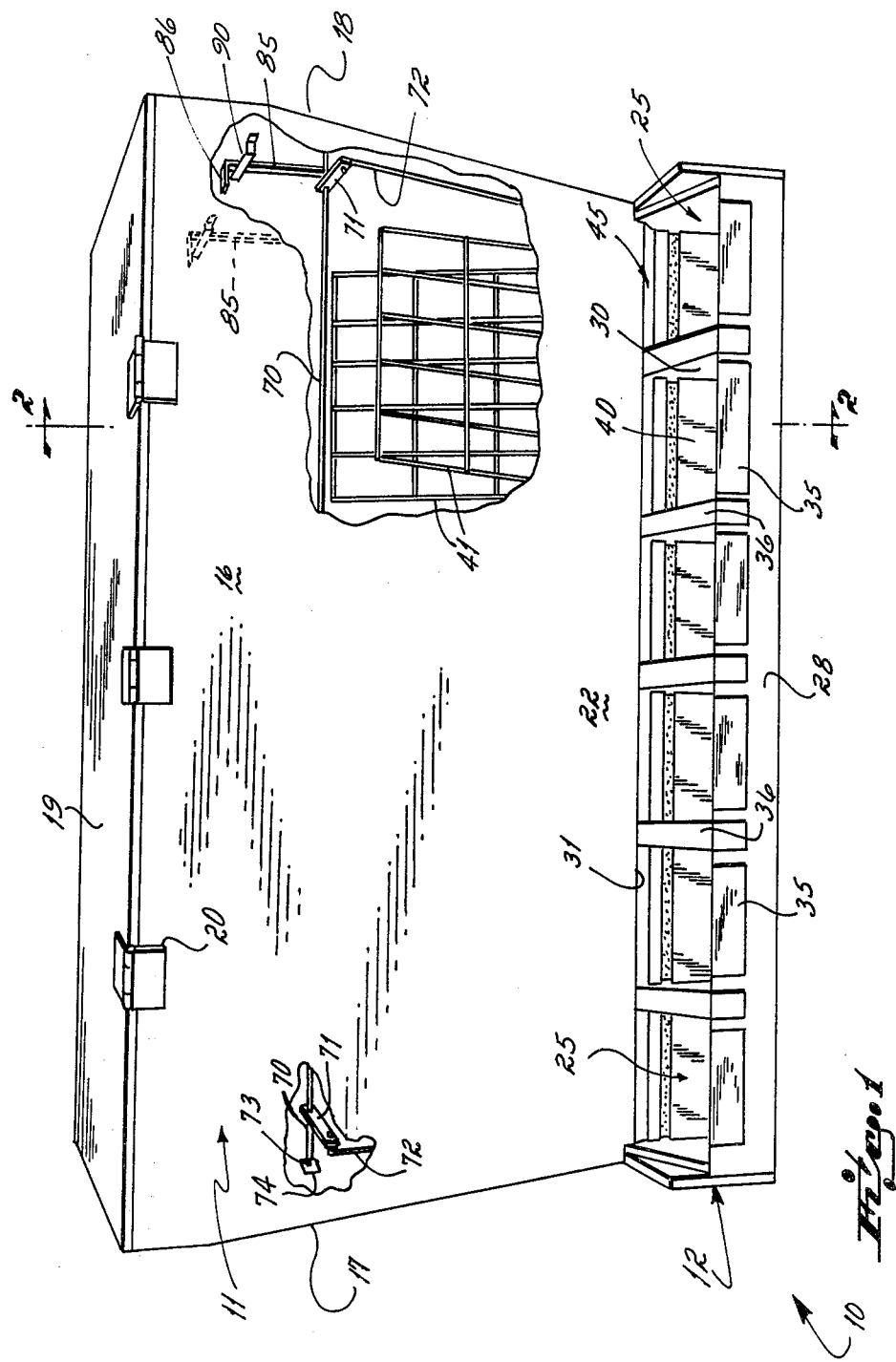

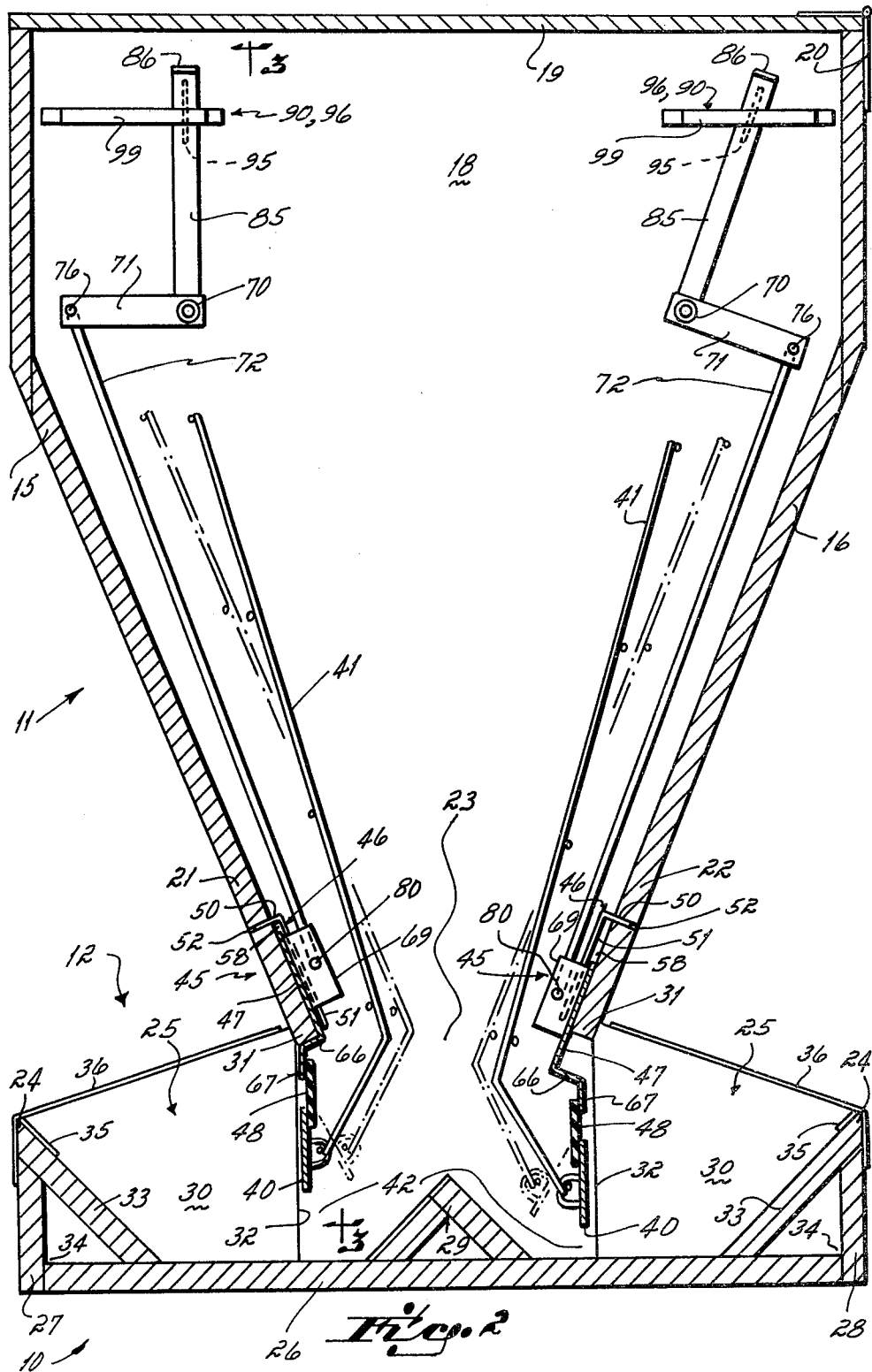

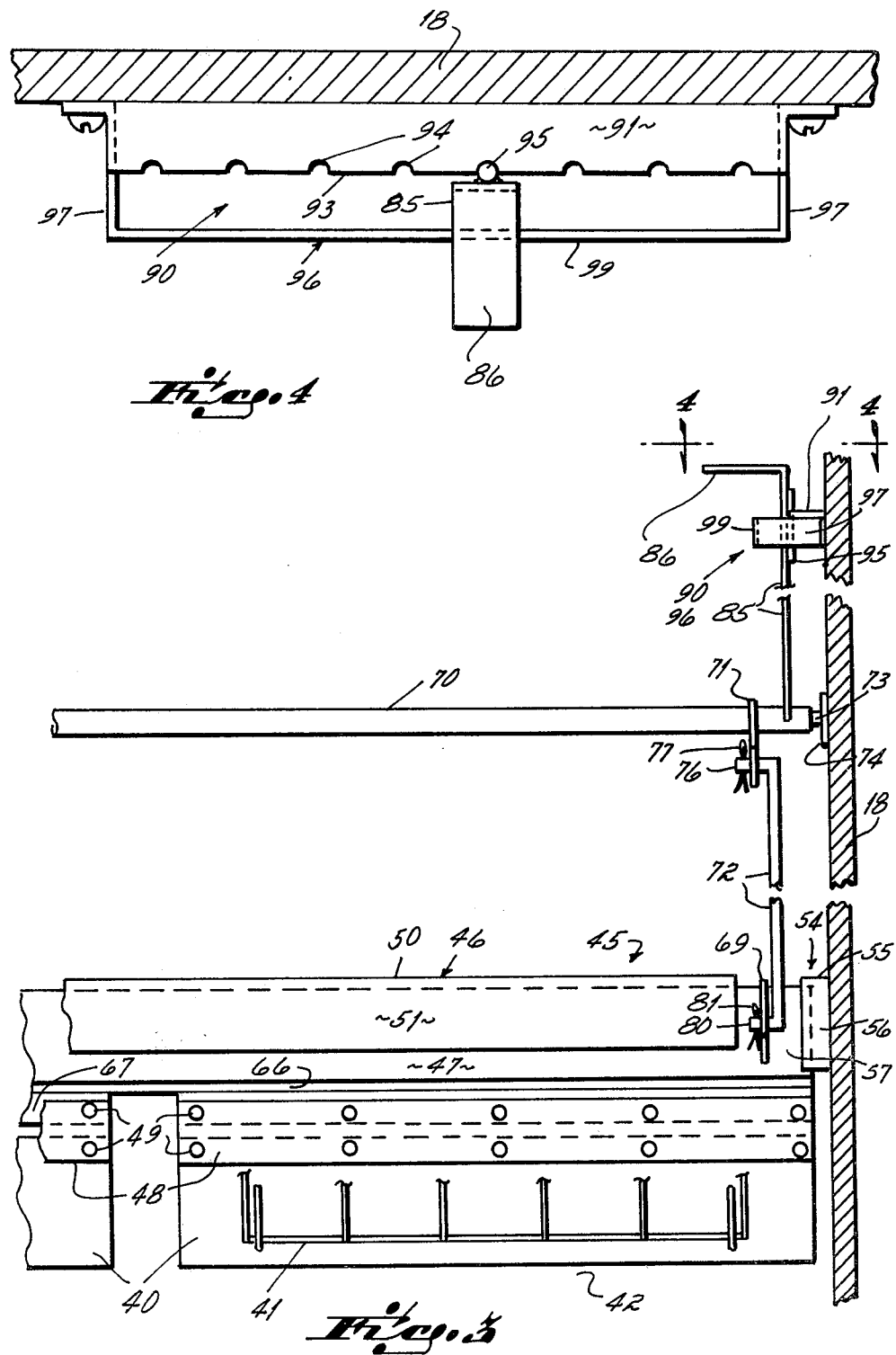

ANIMAL FEEDER

This invention relates to animal feeders, and more particularly to hopper style feeders.

Hopper style feeders commonly comprise a feed storage hopper mounted above a feed trough. Dry food materials stored in the hopper flow downwardly by gravity from the hopper into the feed trough. As the animals consume food from the trough, more food automatically flows into the trough to replace that which has been consumed.

One problem common to this style of feeder is that of the food within the hopper becoming packed such that "bridges" are formed in the feeder that prevent free flow of the food to the bottom trough. To combat these "bridges" and maintain a free flow of food through the feeder, agitating apparatus is commonly arranged within the feeder. One form of agitator comprises a wire grid extending into the hopper from the feed trough and connected at its lower end to a movable agitating plate or so-called butt plate. This butt plate is so positioned in the feed trough that an animal feeding within the trough contacts the butt plate with its nose, thereby agitating or moving the butt plate and its attached agitator grid. Movement of the grid then prevents the build-up of the "bridge" and breaks up any then existing bridge.

In order for food to flow from the hopper into the feed trough it must flow beneath the butt plate. Consequently, the spacing of the butt plate from the bottom of the trough controls the rate of flow from the hopper into the trough. To accommodate gravity flow of differing food materials and/or of food materials of differing granular size and under differing atmospheric conditions, this feed opening must be regularly adjusted to maintain optimal flow from the feeder. But, the adjustment of this opening has always been a problem or difficulty with such feeders. So far as I know, this adjustment of agitator style gravity flow feeders has always required that the adjustment be made at the trough; that is, by a workman kneeling and reaching into the feed trough to make the adjustment. Consequently, such feeders are not usually adjusted as frequently as would be desirable, and when they are adjusted, it is a time consuming matter. Examples of animal feeders which require such an adjustment at the feeder trough level may be seen in U.S. Pat. No. 3,552,360 and U.S. Pat. No. 2,966,135.

It has been a primary objective of this invention to provide an agitator style of animal feeder in which the feeder opening may be more easily and quickly adjusted than in any now existing feeders.

It has been another objective of this invention to provide adjustment of the food opening of an agitator style of feed hopper which may be easily made by means of an adjustment mechanism accessible through the open top of the hopper.

According to the practice of this invention, this adjustment mechanism comprises an oscillatable handle disposed at the top of the feeder which is connected to the adjustable butt or agitator plate through a crank lever so that movement of the handle effects movement of the butt plate. The connection is such that the adjustment may be made independently of the amount of feed in the hopper and without the use of any tools.

In the preferred embodiment of the invention, the oscillatable handle is connected to a rotatable sleeve from which the crank lever extends. A connecting rod connects the crank lever to a slide plate mounted within a housing in the bottom of the hopper. The butt or agitator plate is suspended from this slide plate. The connections between the operating handle and the slide plate are such that oscillation of the handle effects vertical movement of the slide plate and the attached butt plate.

The primary advantage of this invention resides in the fact that feed opening adjustments may be easily made from the top of the hopper without any special tools. Consequently, the feeder will be more frequently adjusted to accommodate all of the differing conditions to which such feeders are commonly exposed and will be maintained in a condition in which there is the free flow of food through the opening without excessive flow and without blockage of flow.

These and other objects and advantages of this invention will be more readily apparent from the following description of the drawings in which:

FIG. 1 is a perspective view of a feeder incorporating the invention of this application.

FIG. 2 is a cross-sectional view taken on line 2—2 of FIG. 1.

FIG. 3 is a cross-sectional view taken on line 3—3 of FIG. 2.

FIG. 4 is a cross-sectional view taken on line 4—4 of FIG. 3.

Referring to FIGS. 1 and 2 it will be seen that the feeder 10 of this invention comprises a hopper 11 for receiving and storing dry, granular, or ground foods and for gravity feeding the foods into a feed trough 12 located beneath the hopper. The feeder is an automatic feeder in the sense that it automatically feeds stored food into the trough 12 as animals consume it.

The hopper 11 comprises side walls 15, 16, end walls 17 and 18, and a cover 19 hingedly secured to one of the side walls 16. The hinges 20 which connect the cover to the side wall permit the cover or lid to be opened so that bags of feed may be dumped into the hopper, and the hopper thereafter closed to prevent moisture in the form of rain or snow from entering the hopper and contaminating the foods stored therein.

As may be seen more clearly in FIG. 2, the lower portions 21, 22 of the side walls 15, 16 of the hopper 11 taper inwardly to form a relatively narrow throat 23 through which feed must pass in the course of flowing into the trough 12. This inward taper of the side walls provides an overhang of those walls over the feed trough 12. This overhang prevents the animals from standing in the trough while feeding and affords some protection of the food contained within the trough.

The feed trough 12 extends for the full length of the hopper 11. Its end walls 17 and 18 are common to the end walls of the hopper. In addition to the end walls 17 and 18, the trough comprises a bottom wall 26 and side walls 27, 28. There is a triangular shaped longitudinal divider 29 which extends for the full length of the trough. This divider functions to force gravity fed food outwardly to the sides of the trough and to prevent food from accumulating in the center thereof where it is not accessible to animals feeding within the trough.

The trough 22 is divided into individual feed bins 25 by transversely extending divider walls 30. These walls 30 extend from the side walls 27 inwardly to a point beneath the hopper. The inner edges 32 of these divider walls terminate at a point immediately beneath the inner edges 31 of the side walls 15 and 16.

Within each feed bin there is a sloping side wall 33 which extends at an angle of approximately 45°, between the top edge 24 of the side wall and the bottom wall 26. These sloping walls 33 prevent food from entering and accumulating in the corner 34 of the trough where it would otherwise be inaccessible to animals feeding in the feed bins 25.

In the preferred embodiment of the invention, the upper edges of the side walls 27, 28 and sloping walls 33 are covered by sheet metal covers 35 which are nailed or otherwise secured to the side and sloping walls 27, 28 and 33. Additionally, the tops of the transverse divider walls 30 have metal covers 36 nailed or otherwise secured thereto. The outer ends of these divider wall covers 36 extend downwardly and are nailed to the sides of the side walls 27, 28. These metal covers 35, 36 function to prevent animals feeding within the trough from eating or otherwise destroying the wooden boards or material of which the feeder is manufactured.

Located within the feed trough 12 there are a series of agitator or butt plates 40, one butt plate 40 being provided for each pair of side-by-side feed bins 25. Extending upwardly from the agitator plates are wire grids 41 which, as explained more fully hereinafter, function to agitate food contained within the hopper and prevent that food from forming a bridge across the throat 23 of the hopper and thereby blocking flow from the hopper into the feed trough.

In order to flow from the hopper 11 into feed bins 25 of the feed trough and thereby become accessible to the animal feeding in the trough 12, the food must flow beneath the agitator plates 40 through an opening or throat 42. The height of this opening 42 is adjustable so as to vary or control the rate of flow of food from the hopper into the feed bins.

Referring now to FIGS. 2 and 3, there is illustrated one agitator grid 41, and the mechanism 45 for effecting vertical adjustment of all of the agitator plates on one side of the feeder. Since the agitator plates 40 and adjustment mechanism 45 on both sides of the feeder are identical, only one is illustrated and described in detail herein. It should be appreciated though that an identical adjustment mechanism 45 is located on the other side of the feeder and that that mechanism 45 also has a plurality of agitator plates suspended from it.

With reference to FIGS. 2 and 3 it will be seen that the mechanism 45 for supporting and adjusting the agitator plates 40 is mounted on the bottom 31 of the side walls 15 and 16. This mechanism 45 comprises a housing 46 and a slide plate 47 adjustably mounted beneath that housing 46. The agitator or butt plates 40 are suspended from the slide plate 47 by means of rubber belting 48 which is connected to the bottom of the slide plate and top of the agitator plate by any conventional connector, as for example nuts and bolts 49.

The housing 46 comprises a top wall 50 and an inside wall 51. The top wall extends into and is fixedly secured within a slot 52 cut into the lower portion 22 of the hopper side wall 16. The inside wall 51 of the housing extends downwardly and inwardly from the top wall 50 generally parallel to the slope of the lower portion 22 of the side wall 16.

Extending inwardly from each end wall 17, 18 of the hopper there is an end bracket 54. Each of these brackets 54 has a top wall 55 coplanar with the top wall 50 of the housing 46 and an inside wall 56 coplanar with the inside wall 51 of the housing. Thus, the brackets 56 form continuations of the housing 46 but with a gap 57 located between the ends of the housing and the end brackets. By using a shortened housing together with end brackets 51 rather than a single full length housing, variances in the length of the hopper may be more easily accommodated.

Between the inside walls 51, 56 of the housing and end brackets, there is a gap or space 58 which is open at the bottom and which functions as a slideway or guideway for the slide plate 47. The slide plate 47 extends upwardly through the open bottom of the gap 58 and is slideable therein.

It will be seen that the upper end section of the slide plate 47 is generally planar and that there is a downwardly and outwardly angled section 66 at the bottom of the planar upper section. This angled section 66 terminates in a vertical section 67. The rubber or resilient belting 48, by means of which the agitator plate 40 is suspended from the slide plate, is attached to the lower vertical section 67 of the slide plate. The purpose of the angled section 66 is to space the agitator or butt plate 40 outwardly beneath the bottom edge 31 of the side walls where the butt plate is more easily engaged by animals feeding within the feed bins 30.

Adjacent the opposite end of the upper planar section of the slide plate 47 there is a pair of inwardly extending slide plate support flanges 69. These flanges protrude inwardly through the gap 57 between the housing inside walls 51, 56 into the interior of the hopper. In the preferred embodiment, these flanges 69 are welded to the upper end of the slide plate.

The slide plate 47 is supported from the end walls 17 and 18 of the hopper. The support comprises a hollow supporting tube or sleeve 70, crank levers 71, and connecting rods 72. The hollow tube 70 is rotatably supported from a pair of trunion shafts 73, one of which is fixedly secured to the inside of each end wall 17 and 18 by a flange 74. The flanges 74 may be bolted to the end walls by wood screws or any conventional connectors. The stub shafts extend into the interior of the hollow sleeve 70 such that the sleeve is free to rotate on the shafts 73.

A pair of crank arms or crank levers extends radially from and is welded to the sleeve 70. At their outer ends, the crank arms each have an aperture within which one end 76 of the connecting rod 72 is received. The end 76 of the connecting rod 72 is retained within the aperture 75 by a cotter pin 77 which extends through a hole (not shown) in the connecting rod 72.

At its lower end 80 each connecting rod 72 is turned inwardly and extends through a hole in flanges 69 fixed to slide plate 47. The lower end 80 of the connecting rod is retained within the hole by a cotter pin 81 extending through a hole (not shown) in the connecting rod.

To control rotation of the tube 70 and resulting angular rotation of the crank arm 71, there is an operating handle 85 extending upwardly from the tube 70. At its lower end the operating handle is welded to the tube such that oscillatory motion of the handle effects angular rotational movement of the tube 70. At its upper end, the operating handle is bent inwardly so as to provide a gripping flange 86 which a person may grasp to move the operating handle 85 through arcuate oscillatory movement.

As best seen in FIG. 4, the operating handle 85 may be retained in any one of eight different angular positions of adjustment. To this end, there is a bracket 90 bolted to the inside of the end wall 18. This bracket 90 has a horizontal leg 91 which extends inwardly from the wall 18. The inner edge 93 of the horizontal leg 91 has eight arcuate notches 94 formed therein into which a generally cylindrical section 95 of the operating handle may be fitted to lock the operating handle in any one of eight different positions of adjustment.

There is preferably a U-shaped bracket 96 extending around the operating handle so as to prevent the handle from being bent inwardly away from the side wall 18 of the hopper. This bracket has parallel end sections 97 welded or otherwise fixedly secured to the ends of the bracket 90 and a connecting web 99 extending between the legs 97. It is the connecting web which prevents excessive inward movement of the operating handle 85 away from the side wall 18 of the hopper.

To effect vertical adjustment of the agitator, the protrusion 95 on the operating handle 85 is moved from one notch 94 to another. Of course, the number of notches is arbitrary and could be varied to accommodate as many positions of adjustment as desired, or alternatively the operating handle may be frictionally locked in position, in which event there will be an infinite number of adjustment positions available. Angular movement of the operating handle 85 from one notch 94 to another results in rotational movement of the tube 70 and of the connected crank arm 71. This angular rotation of the crank arm 71 effects vertical adjustment of the connecting rod 72 and of the attached slide plate 47. Movement of the slide plate effects vertical adjustment of the agitator plate 40 which is suspended from the slide plate.

In operation, bags of feed are dumped into the hopper 11 of the feeder so as to provide a large reservoir of feed within the hopper. That feed flows downwardly through the throat 23 of the hopper and outwardly through the feed opening 42 beneath the agitator plate 40 and into the feed bins 25 of the feed trough 12. As animals feed upon the food contained within the feed bins, additional food flows downwardly through the hopper and into those bins, so that the bins remain automatically supplied with food. As the animals feed within the feed bin, their noses bump against the agitator plates 40 causing the plates to move from the solid line position of FIG. 2 to the phantom line position. This movement results in movement of the wire grids 41, which movement breaks up any bridges or impediments to free flow of feed through the hopper throat 23 downwardly into the feed trough. In the absence of the grid those bridges or impediments would block the flow of food at the throat and thereby prevent continued automatic feed from the hopper into the feed trough.

In the event that the flow of food from the hopper into the feed bins is insufficient, or in the event that the size of the food particles contained within the hopper is changed, it may be necessary to raise the agitator plate 40 and increase the size of the opening 42 beneath the agitator plate. In that event, the top of the handle 85 is moved inwardly away from the side walls 15 or 16 as viewed in FIG. 2. This has the effect of causing the slide plate to raise upwardly, thereby moving with it the agitator plate 40 which is suspended from the slide plate. Thus, the feed opening 42 is increased in height. Alternatively, if the feed opening is to be decreased, the handle 85 is moved in the opposite direction, i.e., toward the walls 15, 16 as viewed in FIG. 2, thereby causing the slide plate 47 to move downwardly relative to the housing and the hopper to which the housing is attached. This results in the agitator plate being lowered, thereby decreasing the height of the feed opening or throat 42 through which the food must pass in the course of moving from the hopper into the feed bin 30.

The primary advantage of this invention resides in the ease with which the size of the feed opening 42 between the agitator plate and the bottom wall of the feed trough may be varied to increase or decrease the flow of food through that opening into the feed trough. All that is required is for the workman to open the lid of the feed hopper and shift the handle 85. The workman need not ever get onto his hands and knees and reach into the feed trough as has heretofore been the practice and he needs no tools to make the adjustment.

While I have described only a single preferred embodiment of my invention, persons skilled in this art will appreciate changes and modifications which may be made without departing from the spirit of my invention. Therefore, I do no intend to be limited except by the scope of the following claims:

I claim:

1. An animal feeder comprising, a feed hopper having side walls, end walls, a bottom assembly, and an open top, a movable closure operable to close said open top of said feed hopper, metering means positioned to extend below the lower edge of at least one of said side walls, said bottom assembly including a feed trough under said metering means and in communication with said feed hopper, said metering means including a slide plate housing, a slide plate, and an agitator plate, said housing being mounted upon said one side wall, an enclosure defined between said one side wall and said housing, said slide plate having an upper end extending into said enclosure and a lower end extending below said housing, said agitator plate being pivotally suspended from said slide plate, a wire grid attached to the agitator plate so as to be movable with the agitator plate, said wire grid being located on the inward side of the agitator plate and extending into the feed hopper such that movement of said agitator plate and attached wire grid prevents compacting of feed in the bottom of said hopper, adjustment means for effecting vertical adjustment of said slide plate relative to said housing, said adjustment means including an upwardly extending rod connected at its lower end to said slide plate and at its upper end to one end of a crank arm, said crank arm being rotatable about a transverse shaft extending between said end walls of said feed hopper, and handle means accessible through the open top of said feed hopper for effecting oscillatory movement of said crank arm about said transverse shaft to cause vertical adjustment of said side plate and of the depending agitator plate, and locking means for locking said handle means in any of a plurality of different angular positions of adjustment, said locking means comprising a locking bar fixed to the inside surface of one end wall of said hopper, said locking bar having a plurality of recesses located on the inside edge thereof into which a side edge portion of said handle means is movable to secure said handle means against inadvertent movement.

2. The animal feeder of claim 1 in which the side walls of said feed hopper slope downwardly and inwardly.

3. The animal feeder of claim 1 in which said agitator plate is suspended from said slide plate by at least one strip of rubber belting.

* * * * *